United States Patent [19]
Bartol et al.

[11] Patent Number: 5,744,941
[45] Date of Patent: Apr. 28, 1998

[54] SINGLE-WIRE-CONNECTED HIGH-SENSITIVITY DUAL-MODE A.C./D.C. TURN-ON/TURN-OFF STAGE FOR AN ELECTRONIC VOLTAGE REGULATOR

[76] Inventors: Luis E. Bartol; German Holguin, both of c/o Industrias Condor, S.A. de C.V., Blvd M. Cervantes Saavedra no. 17, Col Granada 11520, Mexico

[21] Appl. No.: 645,611

[22] Filed: May 14, 1996

[51] Int. Cl.$^6$ ................................................. H02P 9/00
[52] U.S. Cl. ................................. 322/28; 322/8; 322/25
[58] Field of Search ................................ 322/28, 29, 60, 322/90; 361/56; 320/64

[56] References Cited

U.S. PATENT DOCUMENTS

| | | | |
|---|---|---|---|
| 3,599,079 | 8/1971 | Ansbro et al. | 322/23 |
| 3,602,797 | 8/1971 | Bleher | 322/28 |
| 4,129,819 | 12/1978 | Arendt | 322/28 |
| 5,202,811 | 4/1993 | Minks | 361/56 |
| 5,245,271 | 9/1993 | Simmons | 322/60 |
| 5,325,044 | 6/1994 | Bartol | 322/25 |

*Primary Examiner*—Steven L. Stephan
*Assistant Examiner*—Nicholas Ponomarenko
*Attorney, Agent, or Firm*—Fuess & Davidenas

[57] ABSTRACT

A turn-on/turn-off stage for an electronic voltage regulator operates (i) between a battery voltage and a ground, and (ii) responsively to a control signal received from an alternator, in order to (1) turn on the voltage regulator, enabling regulation of the alternator, and also to (2) turn off the voltage regulator, presenting a high impedance to a battery. For an "A"-Type Voltage Regulator ("B"-Type Voltage Regulator) the stage includes, in electrical parallel between the battery voltage and the ground, (1) a first resistor in electrical series with (2) a "two-legged" circuit. The (2) "two-legged" circuit includes (2a) a first leg consisting of a first diode forward-biased to the battery voltage in electrical series with (a second diode forward-biased to the battery voltage in electrical series with) a second resistor, in electrical parallel with (2b) a second leg consisting of a second (third) diode forward-biased to the battery voltage and a capacitor. The control signal, preferably derived directly from an alternator stator winding, is received by the two-legged circuit between its first (second) diode and its second resistor. A third resistor is connected to the two-legged circuit between its second (third) diode and its capacitor. A transistor amplifier is connected in electrical series between this third resistor and ground, and serves to amplify a voltage stored upon the capacitor in order to (i) turn on the rest of the voltage regulator, enabling regulation of the alternator, or, alternatively, to (ii) turn off the rest of the voltage regulator, presenting a high impedance of greater than 0.1 megohm to a battery.

14 Claims, 5 Drawing Sheets

5,744,941

SINGLE-WIRE-CONNECTED HIGH-SENSITIVITY DUAL-MODE A.C./D.C. TURN-ON/TURN-OFF STAGE FOR AN ELECTRONIC VOLTAGE REGULATOR

REFERENCE TO RELATED PATENTS AND PATENT APPLICATIONS

The present patent application concerns improvements to electronic voltage regulators in general, and, in particular, concerns improvements to the "ELECTRONIC VOLTAGE REGULATOR PROTECTED AGAINST FAILURE DUE TO OVERLOAD, OR DUE TO LOSS OF A REFERENCE VOLTAGE" that is taught in U.S. Pat. No. 5,325,044 issued Jun. 28, 1994, to the selfsame Luis Bartol who is a co-inventor of the present application. Also, the present patent application concerns improvements to the "OVERLOAD-PROTECTED AND REFERENCE-VOLTAGE-LOSS-PROTECTED ELECTRONIC VOLTAGE REGULATOR FOR VEHICULAR-TYPE ALTERNATORS THAT BOTH TOLERATES MOMENTARY HIGH FIELD CURRENTS AND SUPPRESSES LOW FREQUENCY NOISE" that is taught in U.S. patent application Ser. No. 08/580,763, by said Luis Bartol and by German Holguin, the selfsame co-inventors of the present application.

The contents of the related patent and patent application are incorporated herein by reference.

BACKGROUND OF THE INVENTION

1. Field of the Invention

The present invention generally concerns electronic voltage regulators, such as those found in motor vehicles, that serve to regulate the current in the field winding of an alternator in accordance with the level of a direct current, battery, voltage that is maintained by the alternator.

The present invention particularly concerns the turn-on/turn-off stage of an electronic voltage regulator, by which turn-on/turn-off stage the electronic voltage regulator is prevented from leaking battery current during periods of non-use.

2. Description of the Prior Art

2.1 Previous Electronic Voltage Regulators

Electronic voltage regulator are used with alternators in vehicular and other applications. A voltage regulator serves to apply a pulse-width-modulated voltage signal to the field winding of the alternator. The alternating current voltages that are correspondingly induced in the remaining windings of the alternator—which windings are normally three in number—are rectified, normally in a full bridge rectifier circuit, so as to produce a direct current. This direct current is applied, in parallel with the vehicle's battery, to power the electrical devices of the vehicle, and to maintain the charge of the battery.

An electronic voltage regulator senses the battery voltage, or "+B", of the vehicle. It attempts, by variation in the duty cycle of the pulse-width-modulated output signal, to maintain this battery voltage constant. It so functions independently—within certain limits—of the electrical load on the battery voltage and/or the rotational speed of the vehicle's alternator.

Depending on the specific manner in which the field circuit of the alternator is connected to the battery, the resulting circuit is called in the trade an (i) "A"-type, when one terminal of the field is permanently connected to battery positive and the other field terminal is connected to battery ground through the output driver transistor of the voltage regulator, or a (ii) "B"-type, when one terminal of the field is permanently connected to battery ground and the other field terminal is connected to battery positive through the output driver transistor of the voltage regulator. An "A"-type regulator is generally constructed with an NPN bipolar (or else an N-channel MOS) output driver transistor (which will later be seen in FIGS. 1, 2 and 4), while a "B"-type regulator typically incorporates a PNP bipolar (or a P-channel MOS) output driver transistor (which will later be seen in FIGS. 3 and 5).

In order for an NPN or a PNP bipolar power transistor in use as an output driver to conduct full field current, current paths must be established through the base-emitter junctions of the bipolar power transistors between (i) battery positive and the base of the NPN transistor or (ii) between the base of the PNP transistor and battery negative. Currents in these current paths, also called current bias, are generally of a much smaller magnitude than is the full field current conducted by the collector-emitter junction of the output driver transistor.

Similarly, in order for an N-channel or a P-channel Metal Oxide Semiconductor (MOS) power transistor in use as an output driver to conduct full field current, a voltage difference must be established between the gate and the source junctions of the MOS power transistor. This voltage difference must be established either between (i) battery positive and the gate of an N-channel MOS transistor, or else between (ii) the gate of a P-channel MOS transistor and battery negative. These voltages, also called a voltage bias, drive currents loads of a much smaller magnitude than is the full field current conducted through the drain-source channel of the output driver transistor.

From the preceding discussion it is clear that, in order to unconditionally enable or disable the field current conduction characteristic of the output driver transistor of either the bipolar or the MOS types, it is sufficient to enable or disable its bias path (either current bias for bipolar transistors or else voltage bias for MOS transistors). This will be seen to be the control function performed by the turn-on/turn-off stage of the present invention independently of other, control, functions that are performed on the bias path by the error amplifier stage of the voltage regulator.

2.2 The Turn-On/Turn-Off Circuit of an Electronic Voltage Regulator

In order to insert and use a voltage regulator in a vehicle's electrical system, it is necessary to provide a means for turning it both "on" and "off". When turned "off", or in standby mode, the voltage regulator is not functioning. It should, by nominal automotive industry standards (circa 1996), not leak more than two milliamperes (2 mA) battery current, thereby to prevent discharge of the vehicle's battery during reasonably extended periods of vehicular non-use.

In the history of voltage regulators, this turn-on/turn-off function progressed from an early manual activation accomplished through the vehicle's ignition switch to a present activation that is fully automatic. The progression from manual to automatic activation parallels progress in constructing fully electronic, as opposed to electromechanical, voltage regulators. The present invention will be seen to concern improvements to those fully electronic voltage regulators which are both state of the art, and predominant, worldwide circa 1996.

A fundamental difference between the manual and the automatic activation of a voltage regulator lies in the fact that, in automatic mode, the voltage regulator will permit field current to flow only when the vehicle's alternator is made to rotate (because of its mechanical link to the vehicle's engine). The precise alternator speed at which field current flows is commonly called in the trade "cut-in speed", or simply "cut-in". Automatic activation is a highly desirable condition, as it precludes rapid battery discharge should the vehicle's ignition switch be inadvertently left turned on without the engine turning.

Concurrently, the cut-in speed should ideally be designed to turn on the electronic voltage regulator when the alternator is rotating at sufficient speed to generate nominal maintenance current. Modern alternators are designed to generate a substantial amount of current (at nominal system voltage) at the engine's idle speed (about 600 to 900 rpm)—thereby imposing a further, sensitivity, requirement to the turn-on function. Likewise, when the engine is turned off, the voltage regulator must be reliably turned off regardless of any ambient conditions of high electrical noise caused either by some of the vehicle's own electrical loads being left connected, and/or by various outside sources of radiated electromagnetic energy.

Still furthermore, it is desirable that the turn-on/turn-off function should be flexible to accommodate various possible activation modes, that is, different signal sources that the vehicle's electrical system designer can choose from, according to particular preferences and/or specific system requirements. These signal sources may vary from low level signals derived from the alternator to a full battery interrupted voltage, and may be in nature either an a.c. or d.c. signal.

Finally, as is desirable (in all manner of mass-produced items), the turn-on/turn-off circuitry of an electronic voltage regulator should be at least as reliable as the main regulation function of the electronic voltage regulator, and, most importantly, should add minimal complexity and cost.

SUMMARY OF THE INVENTION

The present invention contemplates a new turn-on/turn-off stage, or circuit, for an electronic voltage regulator. A turn-on/turn-off stage, or circuit, for an electronic voltage regulator is that stage that, responsively to full battery interrupted voltage or to low level signals derived from the very alternator that is regulated in its output voltage by the voltage regulator, serves to place the voltage regulator into a high impedance state (that, by nominal industry standard, leaks less than two milliamperes battery current) during all times when the alternator is not rotating, therein to prevent discharge of the battery. Conversely, as soon as the alternator reaches a certain speed, the same turn-on/turn-off stage, or circuit, must turn on the electronic voltage regulator, and permit it to begin regulation.

The new circuit is very reliable. It does not have nor require any diodes or other semiconductors to be within the alternator, and consists of only a few high-reliability components within the electronic voltage regulator itself.

The new circuit is very sensitive, and responds to any of d.c., a.c., combination a.c. and d.c., or stochastic signals. It may, for example, directly use, among many other possibilities, a very low voltage signal that is developed at any one of the three stator phase terminals of the alternator. The circuit is versatile to respond to almost any signal whatsoever, including a low-level digital logic signal.

Whether connected to an alternator stator phase terminal signal source or any other, the new circuit is typically so connected to but one signal by but one single wire.

The new circuit, and an electronic voltage regulator incorporating the circuit, have a very low leakage current of the order of one hundred microamperes (100 µA). This is equivalent to an impedance of greater than 0.1 megohm to a 12 volt battery.

Finally, the new circuit is inexpensive, consisting as it does of only a few components added to electronic voltage regulators of existing designs.

1. Connection and Performance of the New Turn-On/Turn-Off Stage for an Electronic Voltage Regulator in Accordance With the Present Invention The new electronic voltage regulator turn-on/turn-off stage of the present invention is each of (i) connected to an alternator for turn-on/turn-off control by but one single wire, (ii) of a high, millivolt, sensitivity in its operation and (iii) dual-mode in responding to either an a.c. or a d.c. control signal.

Although probably rot its greatest advantage, an electronic voltage regulator that is turned on and off by the new turn-on/turn-off stage of the present invention greatly betters the nominal two milliamperes industry standard for current leakage. An electronic voltage regulator so turned off by operation of the new stage in fact leaks less than three hundred microamperes (300 µA). More importantly, the new electronic voltage regulator turn-on/turn-off stage is exceptionally reliable, and highly resistant to failure.

The electronic voltage regulator turn-on/turn-off stage of the present invention may be wire-connected to (i) an existing auxiliary diode trio of an existing alternator, to (ii) a switched "B+" connection, usually activated by the vehicle's ignition switch, or, as a preferred ultimate and least expensive connection, to (iii) any of the three stator phase terminals of the alternator. The new electronic voltage regulator turn-on/turn-off stage is thus of nearly universal applicability.

When the electronic voltage regulator turn-on/turn-off stage of the present invention is wire-connected to (i) a d.c. voltage source, such as an existing auxiliary diode trio of an existing alternator, or to (ii) a switched "B+" connection, then it is responsive to a small d.c. voltage, typically four hundred millivolts (400 mV) d.c..

When the selfsame identical electronic voltage regulator turn-on/turn-off stage of the present invention is wire-connected to (iii) any of the three stator phase terminals of the alternator, then it is responsive to the small pulsing a.c. voltage therein developed, typically seven hundreds millivolts (700 mV) peak voltage having a frequency typically above one hundred and fifty hertz (150 Hz). In other words, the selfsame turn-on/turn-off stage of the present invention is sensitive to either d.c. or a.c. voltages to perform its function.

The electronic voltage regulator turn-on/turn-off stage so functioning is connected between, and so operates between, a battery voltage and a ground. This connection provides power for signal amplification, which power need not be supplied by the signal itself. It is in this location that the new turn-on/turn-off circuit is responsive to a control signal received from an interrupted battery voltage, or to a low level a.c. or d.c. signal derived from the alternator, to either (i) turn on the voltage regulator enabling regulation of the alternator to commence, or else to (ii) turn off the voltage regulator, causing the voltage regulator to present a high impedance to a battery.

2. An Alternative Way of Characterizing the New Turn-On/Turn-Off Stage of an Electronic Voltage Regulator: Flexibility in the Low level Control Signal Used The new turn-on/turn-off stage of an electronic voltage regulator in accordance with the present invention is distinguished by being responsive to a low level d.c. or a.c. control signal indicative of the rotation of an alternator to perform its turn-on/turn-off control function. This extreme flexibility is realized because, as just explained in the preceding section, the low level control signal does not supply the (d.c.) power for its own amplification; the battery supplies this power.

In particular, the low level control signal that is indicative of the rotation of an alternator and that is either d.c. or a.c. is converted in a low level converter stage into an intermediate d.c. control signal. An amplifier amplifies this intermediate d.c. control signal to provide the enablement function to the bias path of the output driver in order to either (i) turn on the voltage regulator, enabling regulation of an alternator, or else to (ii) turn off the voltage regulator, presenting a high impedance to a battery.

3. Structure of the Preferred Embodiments

Broadly and in general, a turn-on/turn-off stage, or circuit, for an electronic voltage regulator in accordance with the present invention is typically responsive to a control signal indicative of the rotation of an alternator in order to turn on and to turn off the voltage regulator. Such an electronic voltage regulator turn-on/turn-off stage includes (i) a low level converter stage for converting a low level control signal, indicative of the rotation of an alternator, that is any of a.c. or d.c. or combination a.c. and d.c. or stochastic to an intermediate d.c. control signal, and (ii) an amplifier for amplifying the intermediate d.c. signal to produce the control signal to which the voltage regulator is responsive to turn on, enabling regulation of an alternator, and to turn off, presenting a high impedance to a battery.

More specifically, a turn-on/turn-off stage for electronic voltage regulators in accordance with the present invention operates (i) between a battery voltage and a ground, and (ii) responsively to a control signal received from an alternator or from any suitable a.c. or d.c. voltage source, in order to (1) turn on the voltage regulator, enabling regulation of the alternator, and also to (2) turn off the voltage regulator, presenting a high impedance to a battery.

For an "A"-type ("B"-type) electronic voltage regulator the turn-on/turn-off stage includes a first resistor connected in electrical series between the battery positive and the battery negative with a "two legged circuit". The "two legged circuit" includes (1) a first leg including a first diode forward-biased to the battery voltage in electrical series with (a second diode forward biased to the battery in series with) a second resistor, connected in electrical parallel with (2) a second leg including (2a) a second (third) diode forward-biased to the battery voltage and (2b) a capacitor.

The electrical control signal, derived from the alternator or from any other suitable a.c. or d.c. voltage source, is received by the two-legged circuit between its first (second) diode and its second resistor. A third resistor is connected to a node formed by the second (third) diode and the capacitor. A transistor amplifier is connected in series between this third resistor and ground. The amplifier serves to amplify a voltage stored upon the capacitor to turn on an output driver of the voltage regulator, enabling regulation of the alternator, and to turn off this voltage regulator output driver, presenting a high impedance to a battery.

For an "A" type electronic voltage regulator the amplifier includes a first NPN transistor connected with a second PNP transistor in a collector driver configuration through a voltage divider. The voltage divider is constructed as (i) a fourth resistor connected between the collector of the first NPN transistor and the base of the second PNP transistor, and (ii) a fifth resistor connected between the emitter and the base of the second PNP transistor. The collector of the second PNP transistor provides the enablement function to the bias path of the voltage regulator's output driver. For a "B" type electronic voltage regulator the amplifier includes a first NPN darlington transistor, the collector of the first NPN darlington transistor provides the enablement function to the bias path of the voltage regulator's output driver.

These and other aspects of the present invention will become increasingly clear upon reference to the following specification and the accompanying drawings.

DESCRIPTION OF THE PREFERRED EMBODIMENT

1. Construction of a Prior Art Turn-On/Turn-Off Stage for an Electronic Voltage Regulator In reference to FIG. 1, a prior art embodiment of the turn-on/turn-off stage, or circuit, for an "A"-type electronic voltage regulator includes, between the "Diode Trio Output" alternator-derived control signal and the "GND" battery negative a parallel connection comprised of (1) a first (R1A) resistor and a second (R2A) resistor in electrical series with the base-emitter junction of a first (Q1A) NPN transistor connected with a second (Q2A) PNP transistor in a collector driver configuration. The collector of the (Q1A) NPN transistor is connected to the base of the (Q2A) PNP transistor through the (R3A) resistor and the (R4A) resistor, which resistors make up a voltage divider. The collector of the (Q2A) PNP transistor provides the enablement function to the bias path of the voltage regulator's output driver NPN transistor.

Figure 1:
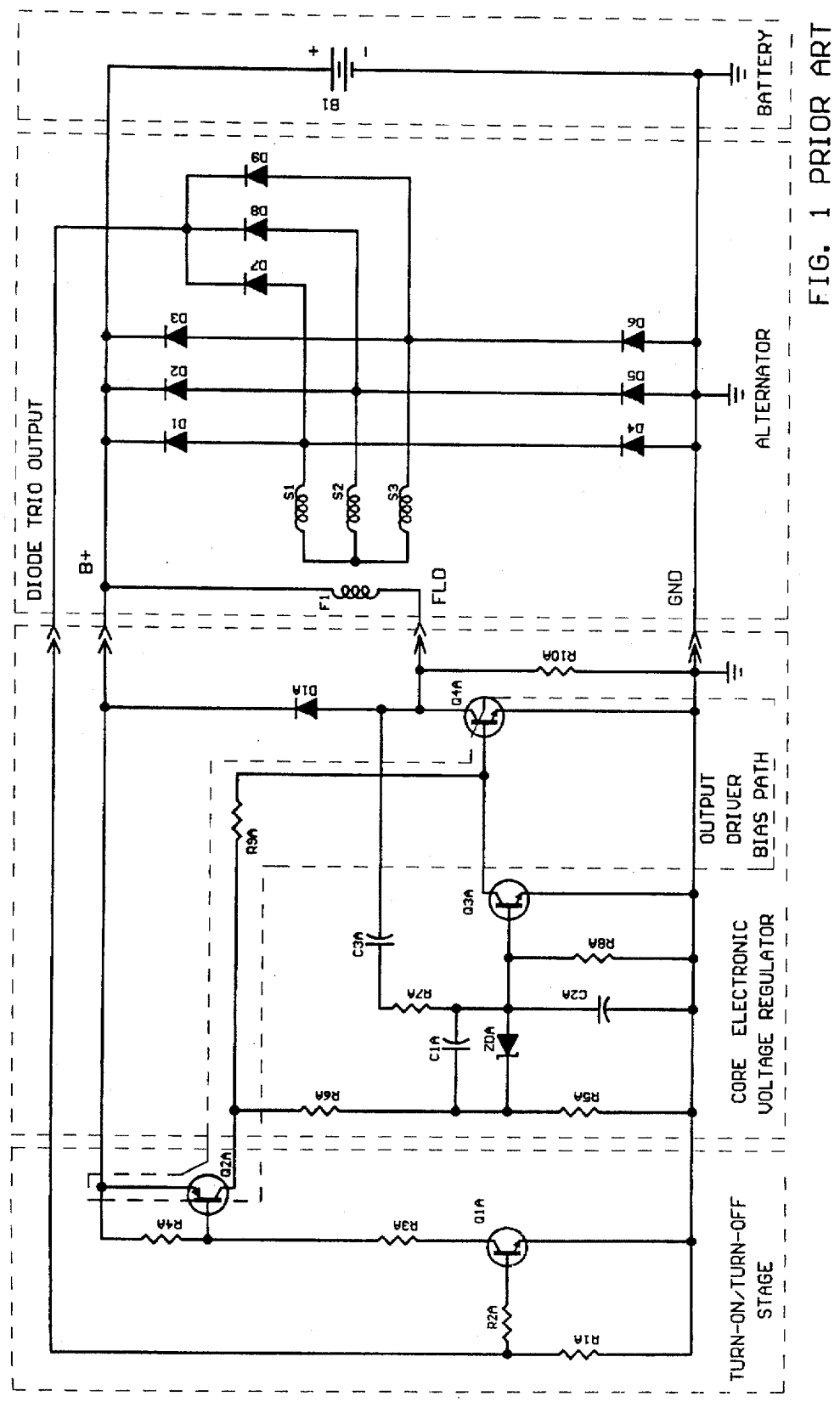
FIG. 1 is a schematic diagram of a prior art "core" electronic voltage regulator, a prior art alternator, and most importantly to the present invention, a prior art turn-on/turn-off stage for the electronic voltage regulator.

1.1 Functional Description of the Prior Art Turn-On/Turn-Off Stage for an Electronic Voltage Regulator A functional description of the prior art turn-on/turn-off stage for an "A"-type electronic voltage regulator, referenced to the schematic diagram of FIG. 1, is as follows:

First consider the standby condition in which the voltage developed by the "Diode Trio Output" alternator-derived control signal across the first (R1A) resistor is zero. This zero control signal it is not sufficient to overcome the voltage barrier of the base-emitter junction of the first (Q1A) NPN transistor, then this transistor will remain turned off. This turned-off condition of the (Q1A) NPN transistor is suitably further amplified by the (Q2A) PNP transistor and is used to place the entire voltage regulator in a high impedance state to a battery.

Now consider the case when the engine is started and the alternator begins to turn (because of the mechanical link to the engine). Under this condition the voltage regulator must be turned on and regulation must be provided. A small voltage is then induced at the terminals of the alternator's stator windings (because of the relative movement of the residual magnetic field in the rotor of the alternator within the stator windings). This induced voltage is rectified by the diode trio, and is provided as the "Diode Trio Output" control signal. When this rectified control signal becomes sufficiently positive with respect to ground so as to overcome the base-emitter barrier of the (Q1A) NPN transistor, then current will flow through the (R2A) resistor and through the base-emitter junction of the (Q1A) NPN transistor, thus turning on the (Q1A) transistor. This turned-on condition is further amplified by the (Q2A) PNP transistor, enabling the bias path through the (R9A) resistor of the voltage regulator's NPN output driver and permitting the entire electronic voltage regulator to function.

In accordance with the preceding explanation, a small d.c. control signal that is derived from, for example, the "Diode Trio Output", or else, alternatively, a battery positive interrupted terminal, is used to control the powering on and the powering off of an electronic voltage regulator.

2. Construction of a First, Preferred Embodiment of the New Turn-On/Turn-Off Stage for an Electronic Voltage Regulator In Accordance With the Present Invention Referring to FIG. 2, a preferred embodiment of the new turn-on/turn-off stage for an "A"-type electronic voltage regulator includes, between the battery voltage and the ground, (1) a first (R1B) resistor that is connected in electrical series with (2) a circuit called, for lack of a better term, a "two-legged" circuit. The "two-legged" circuit has, needless to say, two legs.

A (2a) first leg of the "two-legged" circuit includes (D1B) a first diode forward-biased to the battery voltage in electrical series with (R2B) a second resistor. This (2a) first leg is connected in electrical parallel with a (2b) second leg, which second leg includes (D2B) a second diode forward-biased to the battery voltage, in series with a (C1B) capacitor.

The electrical control signal from the alternator is received by the "two-legged" circuit between its (D1B) first diode and its (R2B) second resistor.

Finally, an amplifier is connected to the (2b) second leg of the "two-legged" circuit between the (D2B) second diode and the (C1B) capacitor through the (R3B) resistor. The amplifier amplifies the voltage stored upon the capacitor to, depending upon the magnitude of the voltage, either (i) turn on the voltage regulator, enabling regulation of the alternator, or else (ii) turn off the voltage regulator, presenting a high impedance to a battery. As might well be expected, the amplifier is made up of one or more transistors. In the first, preferred embodiment of the present invention, the amplifier is constructed with a (Q1B) NPN transistor and a (Q2B) PNP transistor in a collector driver configuration.

The collector of the (Q1B) NPN transistor is connected to the base of the (Q2B) PNP transistor through the (R4B) resistor and the (R5B) resistor which resistors make up a voltage divider. The collector of the (Q2B) PNP transistor provides the enablement function to the bias path of the voltage regulator's output driver (Q5B) NPN transistor.

Figure 2:
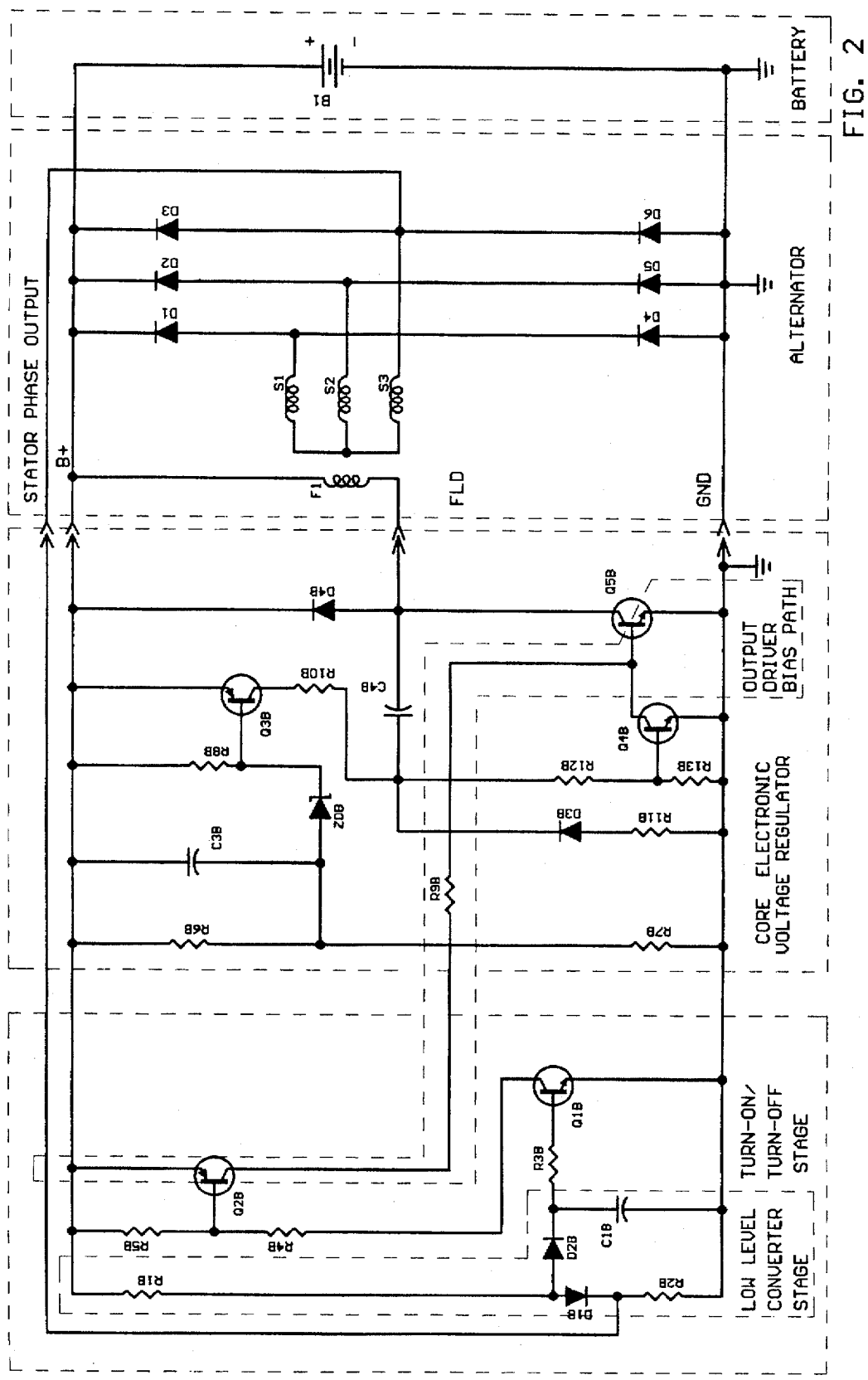
FIG. 2 is a schematic diagram of (i) the preferred first embodiment of the "core" electronic voltage regulator, and (ii) the prior art alternator, in combination with (iii) a first embodiment of the turn-on/turn-off circuit, or stage, of the present invention.

2.1 Functional Description of the First, Preferred Embodiment of the New Turn-On/Turn-Off Stage for an Electronic Voltage Regulator A functional description of a first preferred embodiment of the new turn-on/turn-off stage, for an "A"-type electronic voltage regulator, referenced to the schematic diagram in FIG. 2, is as follows:

First consider the standby condition in which the voltage developed by the alternator-derived control signal across the second (R2B) resistor is zero. The battery therefore supplies current through the first (R1B) resistor, the first (D1B) diode and the second (R2B) resistor. This current is the standby current, and is in the order of 100 μA. Under this condition, the voltage developed at the node connecting the first (R1B) resistor and the anode of the first (D1B) diode is not sufficient to overcome the voltage barriers of the second (D2B) diode and the base-emitter junction of the first (Q1B) NPN transistor. This first (Q1B) NPN transistor will remain turned off. This turned off condition of the first (Q1B) NPN transistor is suitably further amplified by the (Q2B) PNP transistor and is used to place the entire voltage regulator in a high impedance state to a battery.

Now consider the case when the engine is started and the alternator begins to turn (because of the mechanical link to the engine). Under this condition the voltage regulator must be turned on and regulation must be provided. A small voltage is induced at the terminals of the alternator's stator windings because of the relative movement of the residual magnetic field in the rotor of the alternator within the stator windings. The voltage signal that controls the new turn-on/turn-off stage is applied across the second (R2B) resistor, creating a back-biasing effect at the cathode of the (D1B) diode and producing a voltage-follower effect at the anode of this (D1B) diode. (The (R2B) resistor has a low resistance value for canceling electric noise).

When the control signal is sufficiently positive with respect to ground, the voltage-follower effect elevates the voltage at the anode of the first (D1B) diode, thus bypassing the standby current supplied by the battery from the first leg of the "two-legged" circuit to the second leg and charging the (C1B) capacitor through the (R1B) resistor and the (D2B) diode. The (C1B) capacitor and (R1B) resistor together establish a charging RC time-constant. When the (C1B) capacitor is charged to a voltage enough to overcome the base-emitter barrier of the (Q1B) transistor, the current will flow through the (R3B) resistor and through the base-emitter junction of the (Q1B) transistor, thus forming a discharge RC time-constant, thus turning on the (Q1B) transistor.

The battery thus serves to charge the capacitor when, and as, the control signal comes to spend all (in the case of a d.c. control signal) or even part (in the case of an a.c. control signal) of its time at a voltage greater than zero. Ultimately, the time constant of the discharge RC circuit (that consists of the (C1B) capacitor, the (R3B) resistor plus the input impedance of the base-emitter junction of the (Q1B) transistor) being satisfied, and an adequately high voltage building on the capacitor, the (Q1B) transistor will remain conducting. This conduction enables the bias path of the voltage regulator's NPN output driver and permits the entire electronic voltage regulator to function.

In accordance with the preceding explanation, a very small a.c. or d.c., or, for that matter, a combination a.c. and d.c. or a stochastic, control signal that is derived from, for example, a terminal of the stator winding of an alternator, from a "Diode Trio Output", or from any suitable a.c. or d.c. signal may be used to reliably control the powering on and the powering off of an electronic voltage regulator.

Figure 4:
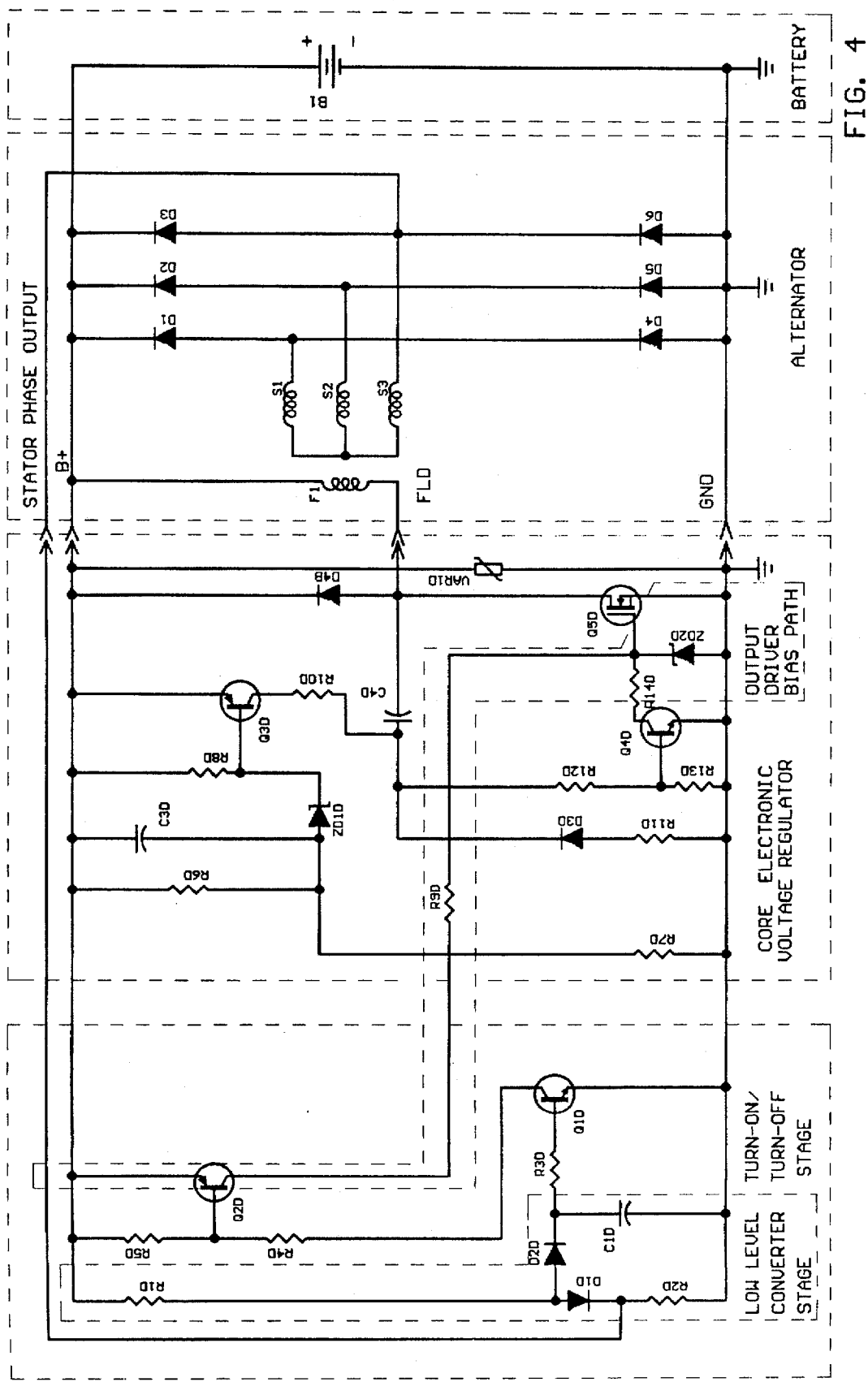
FIG. 4 is a schematic diagram of (i) yet another, third, embodiment of a "core" electronic voltage regulator, similar to the embodiment previously seen in FIG. 2, in combination with (ii) the prior art alternator in combination with (iii) the first embodiment of the turn-on/turn-off circuit, or stage, of the present invention.

The above discussion applies equally well when the output driver transistor is an N-channel, MOS power transistor (as shown in FIG. 4) rather than an NPN power transistor. In this case, as explained in the BACKGROUND OF THE INVENTION portion of this specification, a voltage bias between the gate-source channel of the MOS power transistor establishes the enablement function to this transistor. The turn-on/turn-off control stage of the present invention will then validate or cancel this enablement function, in the same manner as applies to the NPN power transistor discussed above.

3. Construction of a Second, Preferred Embodiment of the New Turn-On/Turn-Off Stage for an Electronic Voltage Regulator Referring to FIG. 3, a schematic diagram of a second preferred embodiment of the new turn-on/turn-off stage of the present invention is shown. The embodiment shown is for a "B"-type circuit electronic voltage regulator and includes, between the battery voltage and the ground, (1) a first (R1C) resistor that is connected in electrical series with (2) a circuit still called a "two-legged" circuit. The "two-legged" circuit still has, needless to say, two legs.

A (2a) first leg of the "two-legged" circuit includes (D1C) a first diode forward-biased to the battery voltage in electrical series with (D2C) a second diode forward-biased to the battery voltage in electrical series with (R2C) a second resistor. This (2a) first leg is connected in electrical parallel with a (2b) second leg, which second leg includes (D3C) a third diode forward-biased to the battery voltage, in series with a (C1C) capacitor.

The electrical control signal from the alternator is received by the "two-legged" circuit between its (D2C) second diode and its (R2C) second resistor.

Finally, an amplifier is connected to the (2b) second leg of the "two-legged" circuit between the (D3C) third diode and the (C1C) capacitor through the (R3C) resistor. The amplifier amplifies the voltage stored upon the capacitor to, depending upon the magnitude of the voltage, either (i) turn on the voltage regulator, enabling regulation of the alternator, or else (ii) turn off the voltage regulator, presenting a high impedance to a battery. As might well be expected, the amplifier is made up of one or more transistors. In the second, preferred embodiment of the present invention, the amplifier is constructed with a (Q1C) NPN darlington transistor. The collector of the (Q1C) darlington transistor provides the enablement function to the bias path of the voltage regulator's output driver (Q4C) PNP transistor.

Figure 3:
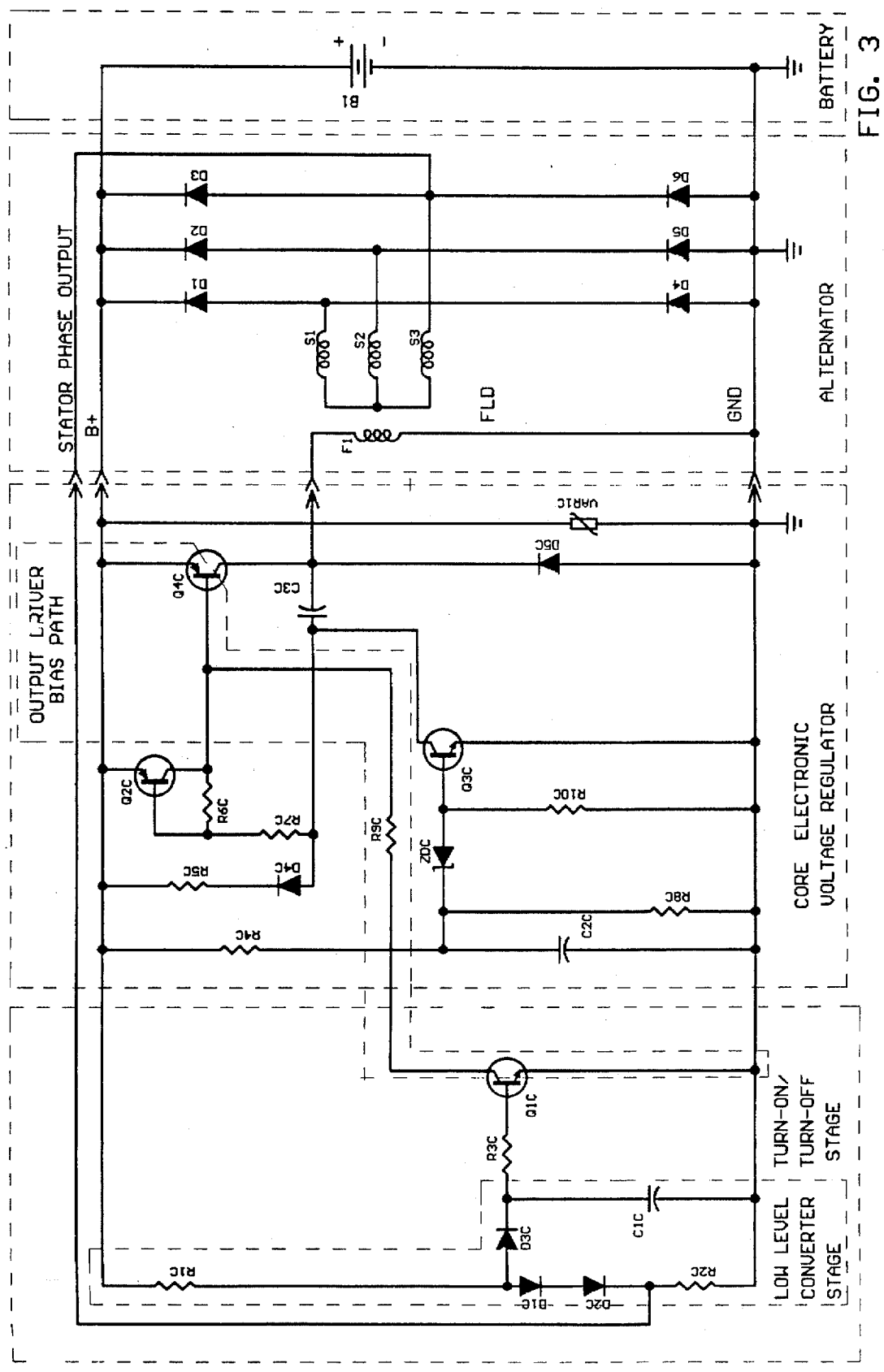
FIG. 3 is a schematic diagram of (i) another, second, embodiment of the "core" electronic voltage regulator, complementary to the first embodiment previously seen in FIGS. 1 and 2, in combination with (ii) the prior art alternator in combination with (iii) a second embodiment of the turn-on/turn-off circuit, or stage, of the present invention.

3.1 Functional Description of the Second, Preferred Embodiment of the New Turn-On/Turn-Off Stage for an Electronic Voltage Regulator A functional description of the second preferred embodiment of the new turn-on/turn-off stage circuit for a "B" type voltage regulator is, by reference to the schematic diagram in FIG. 3, as follows:

First consider the standby condition in which the voltage developed by the alternator-derived control signal across the second (R2C) resistor is zero. The battery therefore supplies current through the first (R1C) resistor, the first (D1C) diode, the second (D2C) diode and the second (R2C) resistor. This current is the standby current, and is in the order of 100 μA. Under this condition, the voltage developed at the node connecting the first (R1C) resistor and the anode of the first (D1C) diode is not sufficient to overcome the voltage barriers of the third (D3C) diode and the base-emitter junction of the first (Q1C) NPN darlington transistor. This first (Q1C) NPN darlington transistor will remain turned off. This turned-off condition of the (Q1C) NPN darlington transistor interrupts the bias path of the voltage regulator's output driver and is used to place the entire voltage regulator in a high impedance state to a battery.

Now consider the case when the engine is started and the alternator begins to turn (because of the mechanical link to the engine). Under this condition the voltage regulator must be turned on and regulation must be provided. A small voltage is induced at the terminals of the alternator's stator windings because of the relative movement of the residual magnetic field in the rotor of the alternator within the stator windings. The voltage signal that controls the turn-on/turn-off stage is applied across the second (R2C) resistor, creating a back-biasing effect at the cathode of the (D2C) second diode and producing a voltage-follower effect at the anode of the first (D1C) diode. (The (R2C) resistor has a low resistance value for canceling electric noise).

When the control signal is sufficiently positive with respect to ground, then the voltage-follower effect elevates the voltage at the anode of the first (D1C) diode, thus bypassing the standby current supplied by the battery from the first leg of the "two-legged" circuit to the second leg and charging the (C1C) capacitor through the (R1C) resistor and the (D3C) diode (which together establish a charging RC time-constant). When the (C1C) capacitor is charged to a voltage enough to overcome the base-emitter barrier of the (Q1C) NPN darlington transistor, current will flow through the (R3C) resistor and through the base-emitter junction of the (Q1C) NPN darlington transistor, thus forming a discharge RC time-constant, and thus turning on the (Q1C) NPN darlington transistor.

The battery thus serves to charge the (C1C) capacitor when, and as, the control signal comes to spend all (d.c.) or even part (a.c.) of its time at a voltage greater than zero. Ultimately—the time constant of the discharge RC circuit (that consists of the (C1C) capacitor, the (R3C) resistor plus the input impedance of the base-emitter junction of the (Q1C) NPN darlington transistor) being satisfied, and an adequately high voltage building on the capacitor—the (Q1C) darlington transistor will remain conducting. This conduction enables the bias path of the voltage regulator's (Q4C) PNP output driver and permits the entire electronic voltage regulator to function.

Again a very small, a.c. or d.c., control signal that is derived from, for example, a terminal of the stator winding of an alternator, may be reliably used to control the powering on and the powering off of an electronic voltage regulator.

Figure 5:
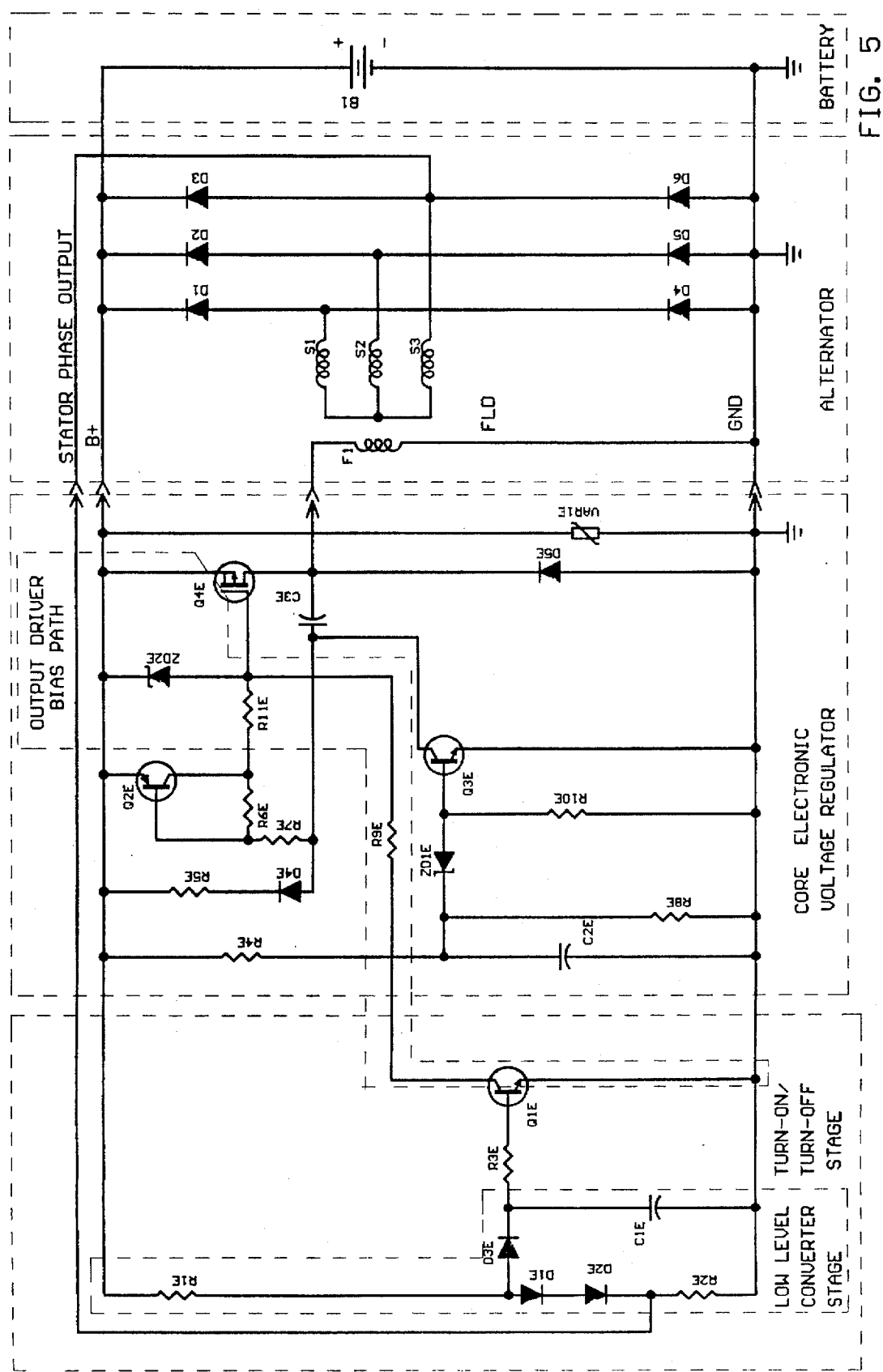
FIG. 5 is a schematic diagram of (i) still yet another embodiment of a "core" electronic voltage regulator, similar to the embodiment previously seen in FIG. 3, in combination with (ii) the prior art alternator, in combiantion with (iii) the second embodiment of the turn-on/turn-off circuit, or stage, of the present invention.

The above discussion applies equally well when the output driver transistor is a P-channel, MOS power transistor, as shown in FIG. 5, rather than a PNP power transistor. In this case, as explained before, a voltage bias between the gate-source channel of the MOS power transistor establishes the enablement function to this transistor. The turn-on/turn-Off control stage of the present invention will validate or cancel this enablement function, in the same manner as applied to the PNP power transistor of the above discussion.

The preferred components, and components values, for all circuit embodiments are given in the following table. All components with an identification ending in "A" are shown within FIG. 1; with an identification ending in "B" within FIG. 2; with an identification ending in "C" within FIG. 3; with an identification ending in "D" within FIG. 4; with an identification ending in "E" within FIG. 5.

| COMPONENT | | VALUE |
| --- | --- | --- |
| R1 | (B, C, D, E) | 120 kilohm, ¼ watt carbon film resistor |
| R2 | (B, C, D, E) | 560 ohm, ½ watt carbon film resistor |
| R3 | (B, C, D, E) | 68 kilohm, ¼ watt carbon film resistor |
| R4 | (B, D) | 10 kilohm, ¼ watt carbon film resistor |
| R5 | (B, D) | 1500 ohm, ¼ watt carbon film resistor |
| D1 | (B, C, D, E) | Silicon rectifier, 1 ampere × 200 volt type 1N4003 or equivalent |
| D2 | (B, C, D, E) | Silicon diode, type 1N4148 or equivalent |
| D3 | (C, E) | Silicon diode, type 1N4148 or equivalent |
| Q1 | (B, D) | NPN small signal transistor type PN100A or equivalent |
| Q1 | (C, E) | NPN small signal darlington transistor type 2N7053 or equivalent |
| Q2 | (B, D) | PNP small signal transistor type PN200A or equivalent |
| C1 | (B, C, D, E) | 0.047 μfd 25 V Y5S ceramic capacitor or equivalent |

Certain variations and adaptations of the turn-on/turn-off circuit in accordance with the present invention (as for instance, operation in systems having voltages different from the nominal 12 volt system discussed in this invention) will suggest themselves to a practitioner of the electronic circuit design arts.

In accordance with these and other possible variations and adaptations of the present invention, the scope of the invention should be determined in accordance with the following claims, and not solely in accordance with those embodiments within which the invention has been taught.

What is claimed is:

1. A turn-on/turn-off stage for an "A" type electronic voltage regulator which stage operates (i) between a battery voltage and a ground, and (ii) responsively to a control signal received from an alternator or from any suitable a.c. or d.c. voltage source, in order to (1) turn on the voltage regulator, enabling regulation of the alternator, and also to (2) turn off the voltage regulator, presenting a high impedance to a battery, the electronic voltage regulator turn-on/turn-off stage comprising:

a first resistor; connected in electrical series between the battery positive and the battery negative with a two legged circuit including a first leg including a first diode forward-biased to the battery voltage in electrical series with a second resistor, connected in electrical parallel with a second leg including a second diode forward-biased to the battery voltage and a capacitor, where the electrical control signal from the alternator or from any other suitable a.c. or d.c. voltage source is received by the two-legged circuit between its first diode and its second resistor; and a third resistor, connected in electrical series between a node formed by the second diode and an amplifier for amplifying a voltage stored upon the capacitor to turn on an output driver of the voltage regulator, enabling regulation of the alternator, and to turn off this voltage regulator output driver, presenting a high impedance to a battery.

2. The "A" type electronic voltage regulator turn-on/turn-off stage according to claim 1 wherein the amplifier comprises:

a first NPN transistor connected with a second PNP transistor in a collector driver configuration through a voltage divider constructed with a fourth resistor connected between the collector of the first NPN transistor and the base of the second PNP transistor and a fifth resistor connected between the emitter and the base of the second PNP transistor;

wherein the collector of the second PNP transistor provides the enablement function to the bias path of the voltage regulator's output driver.

3. A turn-on/turn-off stage for an electronic voltage regulator having stator windings, the stage responsive to a control signal indicative of the rotation of an alternator in order to turn on and to turn off the voltage regulator, the electronic voltage regulator turn-on/turn-off stage comprising:

a low level converter stage for converting a low level control signal received from a stator winding of the alternator, indicative of the rotation of an alternator, that is any of a.c. or d.c. or combination a.c. and d.c. or stochastic to an intermediate d.c. control signal;

an amplifier for amplifying the intermediate d.c. signal to produce the control signal to which the voltage regulator is responsive to turn on, enabling regulation of an alternator, and to turn off, presenting a high impedance to a battery.

4. The turn-on/turn-off stage according to claim 3 adapted for an "A"-type electronic voltage regulator wherein the low level converter stage comprises:

a first resistor; connected in electrical series between the battery positive and the battery negative with a two legged circuit including a first leg including a first diode forward-biased to the battery voltage in electrical series with a second resistor, connected in electrical parallel with a second leg including a second diode forward-biased to the battery and a capacitor, where the low level control signal is received by the two legged circuit between its first diode and its second resistor.

5. The turn-on/turn-off stage according to claim 3 adapted for a "B"-type electronic voltage regulator wherein the low level converter stage comprises:

a first resistor; connected in electrical series between the battery positive and the battery negative with a two legged circuit including a first leg including a first diode forward-biased to the battery voltage in electrical series with a second diode forward-biased to the battery voltage in electrical series with a second resistor, connected in electrical parallel with a second leg including a third diode forward-biased to the battery and a capacitor, where the low level control signal is received by the two legged circuit between its second diode and its second resistor.

6. A method of turning on and turning off an electronic voltage regulator in response to a small level control signal that is indicative of the rotation of an alternator having stator windings, the method comprising:

converting in a low level converter a low level control signal, received from a stator winding of an alternator and indicative of the rotation of the alternator, that is any of a.c. or d.c. or combination a.c. and d.c. or stochastic into an intermediate d.c. control signal; and amplifying the intermediate d.c. control signal to produce a turn-on/turn-off control signal to which the voltage regulator is responsive.

7. A turn-on/turn-off stage for an electronic voltage regulator, which stage is responsive to an a.c. control signal indicative of the rotation of an alternator having stator windings in order to turn on or turn off the voltage regulator, the electronic voltage regulator turn-on/turn--off stage comprising:

a converter stage for converting an a.c. control signal that is (i) carried upon a single wire from a stator winding of the alternator and referenced relative to system negative, and (ii) indicative of the rotation of an alternator, to an intermediate d.c. control signal;

an amplifier for amplifying the intermediate d.c. control signal to produce the turn-on/turn-off control signal to which the voltage regulator is responsive to turn on, enabling regulation of an alternator, and to turn off, presenting a high impedance to a battery.

8. The turn-on/turn-off stage according to claim 7 adapted for an "A" type electronic voltage regulator.

9. The turn-on/turn-off stage according to claim 7 adapted for a "B" type electronic voltage regulator.

10. A turn-on/turn-off circuit for use with a battery having voltage terminals one of which is system negative, an alternator having both (i) field winding, (ii) stator windings and (iii) a three phase full wave bridge rectifier connected across the voltage terminals of the battery for charging the battery, and an electronic voltage regulator, also connected across the terminals of the battery, for producing a pulse-width-modulated signal that varies in response to variations in a voltage across the terminals of the battery, a filter means for filtering electrical noise occurring between the voltage terminals of the battery, an error amplifier means, connected across the terminals of the battery, for producing an output control signal in response to the error voltage received as an input signal from the voltage divider means and a driver, connected across the terminals of the battery, responsive to an enablement signal for producing from the output error amplifier control signal the pulse-width-modulated signal across the field winding of the alternator, the turn-on/turn-off circuit comprising:

a low level converter stage for converting a low level control signal, referenced relative to system negative and indicative of the rotation of an alternator, to an intermediate d.c. control signal;

an amplifier for amplifying the intermediate d.c. control signal to produce the enablement signal to which the driver of the voltage regulator is responsive.

11. The turn-on/turn-off circuit according to claim 10 adapted for an "A" type electronic voltage regulator.

12. The turn-on/turn-off circuit according to claim 10 adapted for a "B" type electronic voltage regulator.

13. A turn-on/turn-off stage for a "B"-type electronic voltage regulator which stage operates (i) between a battery voltage and a ground, and (ii) responsively to a control signal received from an alternator or from any suitable a.c. or d.c. voltage source, in order to (1) turn on the voltage regulator, enabling regulation of the alternator, and also to (2) turn off the voltage regulator, presenting a high impedance to a battery, the electronic voltage regulator turn-on/turn-off stage comprising:

a first resistor; connected in electrical series between the battery positive and the battery negative with a two legged circuit including a first leg including a first diode forward-biased to the battery voltage in electrical series with a second diode forward-biased to the battery voltage, in electrical series with a second resistor, connected in electrical parallel with a second leg including a third diode forward-biased to the battery voltage and a capacitor, where the electrical control signal from the alternator or from any other suitable a.c. or d.c. voltage source is received by the two-legged circuit between its second diode and its second resistor; and a third resistor connected in electrical series between the node formed by the third diode and the capacitor and an amplifier for amplifying a voltage stored upon the capacitor to turn on an output driver of the voltage regulator, enabling regulation of the alternator, and to turn off this voltage regulator output driver, presenting a high impedance to a battery.

14. The "B" type electronic voltage regulator turn-on/turn-off stage according to claim 13 wherein the amplifier comprises:

a first NPN darlington transistor, the collector of the first NPN darlington transistor provides the enablement function to the bias path of the voltage regulator's output driver.

* * * * *